United States Patent [19]
Hunkar

[11] 3,767,339
[45] Oct. 23, 1973

[54] INJECTION MOLDING CONTROL
[75] Inventor: Denes B. Hunkar, Cincinnati, Ohio
[73] Assignee: Hunkar Instrument Development Laboratories, Inc., Cincinnati, Ohio
[22] Filed: Nov. 1, 1971
[21] Appl. No.: 194,224

[52] U.S. Cl................... 425/145, 425/149, 164/154
[51] Int. Cl............................................... B29f 1/06
[58] Field of Search..................... 425/145, 146, 149, 425/150, 449; 164/154

[56] References Cited
UNITED STATES PATENTS

| | | | |
|---|---|---|---|
| 3,628,901 | 12/1971 | Paulson | 425/149 |
| 3,666,141 | 5/1972 | Ma et al. | 425/145 X |
| 3,695,800 | 10/1972 | Hutchinson et al. | 425/146 |
| 3,698,845 | 10/1972 | Paulson | 425/145 |
| 3,632,246 | 1/1972 | Ichikawa et al. | 425/149 X |
| 3,642,404 | 2/1972 | Nagawa | 425/145 |
| 3,726,334 | 4/1973 | Sallberg et al. | 425/145 X |

OTHER PUBLICATIONS
Automation, February 1963, TJ 212.A9, pp. 78–82.

Primary Examiner—R. Spencer Annear
Attorney—James S. Hight et al.

[57] ABSTRACT

An injection molding control provides for the programmable control of ram velocity as a function of the position of the ram through closed-loop feedback of the measured actual velocity. Closed-loop feedback of the actual mold cavity pressure overrides the velocity program in an analog fashion to stop the ram when critical cavity pressure has been attained. A variable length ram stroke provides optimization of the shot size through automatic variation in response to the closed-loop feedback of ram position at the instant of the attaining of critical pressure in the previous injection cycle. The shot size control is used to maintain a constant cushion in each cycle as measured at the instant critical pressure is reached to insure constant product density and uniformity of shrinkage. Automatic recompensation of the velocity program domain with respect to ram position relates the material injection rate more directly to the actual quantity material being injected. Adaption to factors such as material density and viscosity changes is realized.

14 Claims, 2 Drawing Figures

United States Patent [19]
Hunkar

INJECTION MOLDING CONTROL

The present invention relates to controls for injection molding machines.

In the art of injection molding, machines are employed which cyclically supply pasticized material to a mold. These machines are usually of the reciprocating screw type in which the material to be molded is plasticized through the application of heat and the mechanical working of the material by the rotation of a screw within a plasticizing chamber. As the plasticized material is accumulated within the chamber, the screw, which also serves as a ram, retracts away from an injection orifice communicating with a mold cavity. When enough plasticized material has been accumulated, the ram advances toward the orifice in an injection stroke to inject the plasticized material into the mold.

One of the general problems in molding articles is that of insuring that the mold is filled properly with material. Because frequently the molds are quite intricate and irregular in shape, the material tends to flow through the mold in an erratic manner, first flowing into one region then another, and sometimes prematurely solidifying, blocking the flow to certain portions of the mold. This affects the surface finish of the objects and causes non-uniform density and irregular shrinkage of the objects. The rate at which the material flows through the passages of the molds will cause a change in the temperature and thus the viscosity of the material as it flows. By controlling this rate, the filling of the mold can be controlled to some degree. It has been found that injection of material into the molds at a precise programmed rate will greatly enhance the quality and uniformity of the molded products.

To achieve this, it has been attempted in some prior art systems to program the pressure exerted on the ram in order to achieve a more desirable flow pattern into the mold cavity. Some of these prior art devices have attempted to program this injection rate on a time basis. This has, however, not been entirely satisfactory, particularly in view of the fact that the flow rate into the mold is dependent on several variable factors such as the viscosity of the material which is being injected and on various pressure fluctuations within the hydraulic ram driving system. Other systems have attempted to program this injection rate by mechanically synchronizing the position of the valve which supplies fluid to the ram directly to the position of the ram by mechanically actuating cam followers and switches. This again has not entirely overcome the injection rate problem in that intervening variables affect the relationship between the injection rate and the valve position.

It is one principal objective of the present invention to overcome the problems over the prior art and to more precisely control the flow rate of material into the mold in a precise programmed fashion.

Accordingly, the present invention provides a means for programming the injection rate of material into the mold through the programming of the velocity of the ram. The present invention incorporates a velocity program module which operates to control the ram velocity as a function of the position of the ram in direct response to a closed loop feedback signal representative of the actual ram velocity.

The advantage of this particular aspect of the present invention is to overcome certain uncontrollable variables which affect the velocity of the ram such as the material viscosity and hydraulic system variables.

Another problem encountered by those systems of the prior art which have attempted to program the flow rate of material into the mold has been that the program has been inalterably tied in to the exact ram position. However, when the density and viscosity of the material vary, it is desirable to expand or contract the program or to alter the end points of the program in relation to the position of the ram so that the program need not be materially altered nor the mechanical linkages be moved on the machine.

It is another objective of the present invention to provide a velocity program means which will provide velocity programming as a function of ram position but which will allow the program to be alterably associated with the actual position of the ram through simple adjustments within the programming module.

Accordingly, the present invention provides a means which will associate a predetermined velocity control signal with a specific relative domain of the ram stroke and which will furthermore automatically divide the entire operable ram stroke into a plurality of distinct regions. The specific embodiment of the present invention will automatically divide a portion of the ram stroke between two arbitrary selectable end points and to associate the function directly to these regions. As these end points are moved for any reason, the present invention further provides that the program be automatically revised to redivide the new ram stroke domain into the same fixed number of regions and to associate the programmed velocity function with these corresponding regions. Since it may be necessary to revise the end points of this domain to accommodate for varying viscosity or density of the material to be molded, thereby lengthening or shortening the ram stroke, by the provision of the present invention, each portion of the ram velocity program will be directly related to the actual quantity of material fed as the stroke is varied to accommodate material density rather than in previous systems where the program was directly tied to fixed positions of the ram.

Another problem encountered in the prior art has been the difficulty in maintaining a predetermined flow rate into the mold while simultaneously insuring that the fill pressure of the mold cavity does not exceed certain critical values. If a critical value is exceeded, it is found that material will extrude from the junctures of the mold, resulting in what is referred to as a flash. This not only reduces the actual material within the mold, but results in many cases in imperfect finish of the molded object and undesirable defect in the part.

It is a further objective of the present invention to provide means for insuring that the critical pressure of the mold is not exceeded when a precise injection rate program is employed.

Accordingly, the present invention provides means for monitoring the pressure within the mold cavity nad utilizing this pressure to override the velocity program at the end of the injection stroke to limit the amount of material compressed in the mold to some desired value. Furthermore, the present invention provides for a closed loop feedback of the pressure signal from the mold cavity and the comparison of the signals of predetermined value and utilizing the result of this comparison in an analog fashion to override the velocity program. The overriding of the pressure in an analog fashion provides for more precise control of the servo valve which is supplying fluid to the ram, to regulate the deceleration of the ram while preventing loss of control and overshoot of the valve spool element, which may introduce an unpredictable effect on the final pressure within the mold.

Another major area wherein problems arise in the injection molding of objects is the difficulty in insuring that the objects produced fall within high dimensional and weight tolerances. It is important that objects be made in successive molding cycles of the machine in a highly predictable and repeatable manner.

One of the more critical problems in attaining precise repeatable articles of high dimensional and weight tolerances has been the phenomenon involving shrinkage of the molded article upon cooling. This shrinkage is generally inversely related to the pressure and compressed density of the material within the mold at the time the mold is filled. In order to overcome these problems, some prior art attempts have been made to regulate the pressure within the mold at the time that it is filled. Another common practice in the art is to provide a cushion of material at the orifice of the extrusion device upon which a stready holding pressure is exerted so that material is forced into the mold to accommodate for the shrinkage of the material within the mold. However, as the mold cools, it become increasingly difficult to control the pressure within the mold cavity by the exertion of pressure by the ram against the cushion. One reason that this practice has not been wholly successful is that, as the viscosity of the material changes, the density of the material varies and thus the cushion size varies from cycle to cycle. Thus, the effect of the holding pressure operating through the cushion has differing effects from cycle to cycle upon the material within the mold cavity, and thus the density or weight and ultimate shrunk dimension of the molded products varies from cycle to cycle.

The factors which result in changes in viscosity and its effects on the molded material are discussed in detail in the copending application of the inventor of the subject matter of this application, filed Sept. 15, 1971, and entitled "EXTRUDER CONTROL SYSTEM," Ser. No. 180,548.

It is another important objective of the present invention to provide means for controlling the shrinkage of the objects molded from cycle to cycle in a precise and repeatable manner, and furthermore to control in a precise manner the quantity of material extruded to the mold in each cycle of operation. More particularly, it is an objective of the present invention to overcome the cycle to cycle effects of variable changes such as the viscosity of the molded material.

Accordingly, the present invention provides means of maintaining the cushion developed at the end of each injection stroke constant from cycle to cycle and furthermore provides additional means for insuring that the mold cavity fill pressure is also maintained constant from cycle to cycle. In addition, this constant pressure and constant cushion coexist at the same time in each cycle so that a precise pressure and volume relationship exists. This insures that a precise quantity of material, which is dependent on the combination of pressure and volume factors, is the same in each molding cycle. By maintaining the constant pressure in this manner, and by maintaining the constant cushion length through which a holding pressure applied by the ram is exerted, the cooling and consequent shrinkage characteristics of each product will be maintained in very close tolerances from cycle to cycle.

More particularly, the present invention provides a means for measuring the cushion length in each cycle of operation and for treating this information in closed loop feedback manner to a control circuit which affects the cushion length during the next succeeding cycle of operation in a manner which will tend to maintain this cushion dimension constant from cycle to cycle. More particularly, the present invention provides means for measuring the cushion length at the precise instant that the cavity pressure has attained a predetermined value and for comparing this measured cushion dimension with a predetermined standard dimension. Furthermore, the present invention provides for utilizng the information derived in comparison of the actual and standard cushion dimensions to vary the shot size, or the retracted position of the ram at the beginning of the injection stroke, in the next injection cycle in a manner which will tend to correct for differences between the measured actual cushion dimension and the predetermined desired cushion dimension. Furthermore, the present invention provides means for setting a predetermined correction factor to a ram stroke so that, upon each comparison of the cushion dimension, the shot sizes vary by a predetermined fixed amount.

The automatic shot size correction capability which the present invention provides yields a particular advantage in allowing the injection molding machine to compensate for slow varying changes in material density and viscosity and also provides measn to automatically correct for any improper setting of the shot size by the operator and to allow for only a rough initial setting which will be automatically followed by the adapting of the machine to the optimum shot size for the given product being molded.

Furthermore, an additional objective of the present invention is to provide means which are economical and efficient to adapt an injection molding machine to complete computerized control.

Accordingly, the present invention provides a programming module which may serve as an interface between a conventional injection molding machine and a computer. To achieve this, the present programming module of the present invention undertakes to furnish and control those aspects of an injection machine operation which are peculiar to the injection molding process and the particular machine being used and in addition the particular molded object which is being used and formed. In this manner, sophisticated computer master process controls may be used without the necessity of programming these computers to the particular characteristics and properties of different injection molding machines.

These and other objectives and advantages of the present invention will be more readily apparent from the following detailed description of the drawings, illustrating one preferred form of the injection molding control system of the present invention embodied in a reciprocating screw type injection molding machine.

Figure 1:
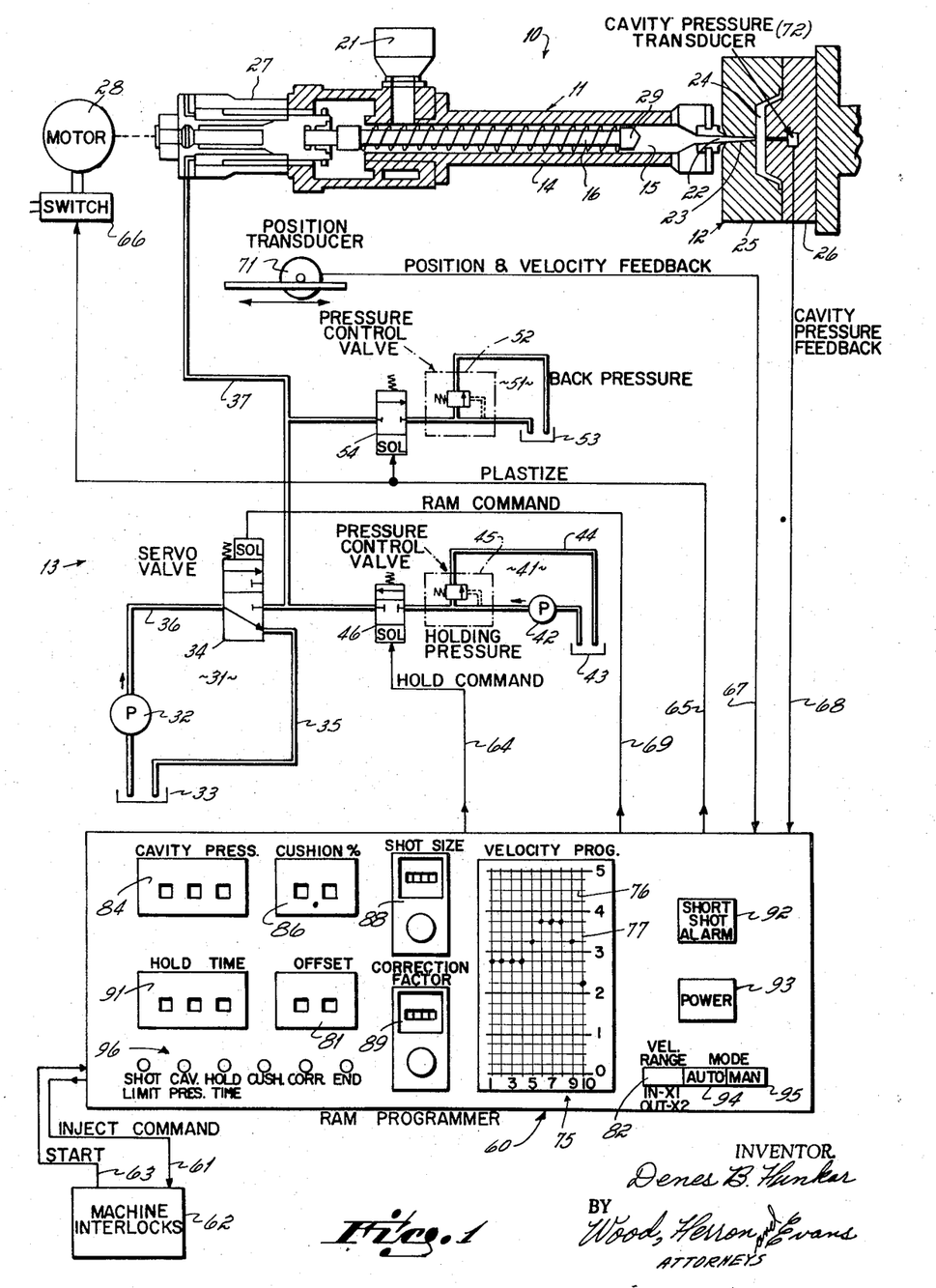
FIG. 1 is a diagrammatic drawing illustrating an injection molding control embodying the principles of the present invention.

Referring to FIG. 1, a conventional injection molding machine 10 is provided which is of the reciprocating screw type. This machine includes an extrusion or injection apparatus 11, a mold assembly 12, and a hydraulic control circuit 13. The injection apparatus 11 includes an injection cylinder housing 14 having a cylindrical chamber 15 defined therein. Within the chamber 15 is provided a screw or ram 16 which is both rotatable and axially movable within the chamber 15.

The upstream end of the chamber 15 communicates with an input hopper 21 through which the material to be molded is inserted into the chamber 15. This material is usually in the form of pellets of thermoplastic material such as polyethylene or polyvinyl chloride. The downstream end of the chamber is provided with an injection orifice 22 which communicates through a passage 23 to the mold cavity 24. The mold cavity 24 of the mold assembly 12 is provided with a pair of mold elements 25 and 26 which are relatively movable toward and away from each other to allow removal of the object which is molded in the cavity 24.

The screw 16 is movable axially within the chamber 15 under the control of a hydraulic piston and cylinder assembly 27. Rotation of the screw 16 is obtained through a motor 28.

The normal operation of the apparatus 10 involves operation through a series of molding cycles, each of which may be considered to begin with the ram 16 in an advanced position with its tip 29 near the downstream orifice 22. As the cycle commences, a nominal amount of back pressure of, for example, 100 to 200 psi, is maintained by the ram 27 to urge the ram toward the downstream orifice 22 while the motor 28 is energized to rotate the ram 16. The ram is rotated in a direction which causes the screw threads to feed material toward the orifice 22 and to accumulate material downstream of the tip 29 of the ram 16. This action, together with heat which is applied to the wall of the cylinder 14, causes the material to plasticize within the chamber 15. This feeding action builds up pressure in the chamber 15 which will overcome the back pressure exerted by the ram 27 and cause the ram to retract away from the orifice 22 until it reaches a full retracted position at the upstream end of the chamber 15. At this point in the cycle, an injection stroke is executed in which high pressure fluid is applied through the cylinder 27 to thrust the ram forward toward the orifice 22 to inject the plasticized fluid into the mold cavity 24. When the mold cavity 24 is filled, the injection pressure increases rapidly to approximately 25,000 to 30,000 pounds per square inch. At this point, the injection pressure is removed and a constant holding pressure in the order of 20,000 psi is maintained through the cylinder 27 acting on the ram 16 to maintain pressure on the material within the cavity 24 until the material begins to harden. This holding period is followed by a cooling period which allows the material to fully harden, after which the molded material is ejected from the mold 12 by the opening of the mold elements 25 and 26. During this cooling period, the plasticizing period of the next cycle begins in which the back pressure is re-applied and the screw again begins to rotate to plasticize additional material and fill the chamber 15 with material for the next ejection cycle.

Three separate hydraulic circuits are provided to control the pressure on the fluid applied to the cylinder 27. These include the main pressure source 31 which applies hydraulic pressure to the cylinder assembly 27 during the ram advancing stroke in the injection part of the cycle. This hydraulic circuit may typically include a high pressure high volume pump 32, a fluid reservoir 33, a servo valve 34, and a return line 35. The servo valve 34 functions to supply high pressure fluid from a high pressure line 36 to the cylinder input line 37, in quantities determined by an analog control signal applied at valve solenoid through a ram command input line 69. Several types of servo valves are satisfactory. It has been found that a valve of the flow control type is quite suitable and efficient for this purpose.

A holding pressure hydraulic circuit 41 is also provided which includes a high-pressure low-volume pump 42, a fluid reservoir 43, a return line 44, a pressure control valve 45, and a solenoid valve 46. When the valve 46 is opened, pressurized fluid is supplied by the pump 42 at a controlled pressure, determined by the setting of the valve 45, to the cylinder input line 37. This circuit operates during the holding portion of the molding cycle.

A third circuit is the back pressure circuit 51, which operates to maintain a back pressure on the ram 16 during the plasticizing portion of the cycle as the ram is retracted under the influence of pressure built up by the material being accumulated in the chamber 15. The ram screw rotates under the power of the motor 28. This back pressure circuit icludes a pressure relief valve 52, a drain reservoir 53, and a solenoid valve 54. As the screw 16 is rotated by the motor 28, the valve 54 is opened, allowing the pressure returning through the line 37 to work against the pressure control valve 52 to maintain the pressure against the ram at the controlled rate set by the valve 52.

The concepts of the present invention are provided through a ram programmer module 60 in combination with the above described injection molding machine. This module 60 operates to control the machine 10 supplying electrical control signals to regulate the operation of the machine through its respective cycles of operation. Thsese signals are supplied through an inject command line 61 which, in the embodiment shown, operates to interrogate the machine interlock circuitry 62 and to return a cycle start signal through a start signal return line 63. Such interlocks may, for example, indicate whether or not the mold is closed and ready for injection. The signals on lines 61 and 63 are binary on-off command signals.

The module 60 also supplies a digital binary on-off hold command signal through the hold command line 64 which connects to the solenoid of the valve 46, in the hold pressure hydraulic circuit 41. The module 60 further provides a plasticize command signal through the control line 65 which is also a binary on-off signal which is applied to the solenoid of the valve 54 in the back pressure hydraulic circuit 51, and which is also connected to control the switch 66, such as a relay or solid state switch, to energize the screw rotation motor 28. The ram command line 69 connects the module program output with the control line of the servo valve 34. The signal on this line is analog in nature and follows a program function generated by the module 60.

The module 60 derives information to control the machine operation through feedback signal lines 67 and 68. the ram position feedback line 67 feeds to the module 60 a signal generated by a ram position transducer 71. The information derived from this transducer 71 is an anlog signal which is directly representative of the linear position of the ram within the chamber 15. This signal is also used to derive a velocity feedback signal indicative of the velocity of the ram at any point within the cycle. While the single transducer 71 is employed in the embodiment illustrated in the generation of both position and velocity feedback signals, it is to be understood that a separate velocity transducer such as an LVDT can be used to generate the velocity feedback signal to the module 60.

The line 68 is a cavity pressure feedback line which connects an input of the module 60 with a pressure transducer 72 located in the mold cavity wall. The pressure transducer 72 is provided within the mold element 26 to directly monitor the pressure of the fluid within the mold cavity 24. This transducer is effective to feedback an analog signal on the line 68 to the programmer module 60 which is directly proportional to the pressure within the cavity 24.

One function of the programming module 60 is to control the velocity of the ram 16 during the injection stroke in such a manner that this ram velocity corresponds to a predetermined program which is a function of the actual position of the ram during its injection stroke. This function is provided primarily by the velocity program generator within the module 60. This program generator includes a patch panel 75 which has a plurality of horizontal conductors 76 and a plurality of vertical conductors 77. The horizontal conductors 76 have associated with each a unique electrical characteristic which, when imposed on the ram command line 69, regulates the position of the servo valve 34 to control the ram velocity. These signals are imposed on the line 69 by connections made on the patch panel 75 to selected ones of the vertical conductors 77. These conductors are connected each through a different switch to the line 69. The switches are energized in correlation with the position feedback signal through line 67. The signal from line 67 is digitized in a manner which will energize only one of the vertical conductors at a time. The energizing of each one of the conductors represents the position of the ram 16 within a specified portion of its stroke. To achieve the digitizing of the position feedback signal 67 to select the appropriate vertical conductor 77, several types of conventional circuits may be employed. One preferred type of circuit would involve the use of a shift register having a pluraltiy of bit positions, one corresponding to each of the vertical conductors 77. Since, during an injection stroke, the ram 16 will always move in the same forward direction, trigger pulses can be derived from the position feedback signal on line 67 as the voltage of the signal crosses a series of thresholds developed by a series of coincidence circuits. Each coincidence circuit is connected to a different voltage reference source such as one of the nodes of a voltage divider network.

In accordance with the description set forth immediately above, a suitable programming module can be constructed in accordance with the teachings of the inventor of the subject matter of this application in his copending patent application Ser. No. 74,644, filed Sept. 23, 1970, entitled "CONTROL SYSTEM FOR PARISON EXTRUDERS," now U.S. Pat. No. 3,712,772. That application is a continuation in part of his U. S. application Ser. No. 875,448, filed Nov. 10, 1969, now abandoned.

The program module patch panel 75 is also associated with two other control factors which may be used to modify the program in bulk without altering its general form. These controls are the offset control 81, which is operative in the disclosed embodiment to additively modify each of the velocity program values of the function programmed on the patch panel 75. Additionally, a velocity range selector 82 is provided which allows the multiplication of the entire function on the patch panel 75.

The program module 60 is also provided with circuitry which provides for the limiting of the cavity pressure to some predetermined value as set by a cavity pressure dial 84. This pressure limit is necessary to eliminate flash from the mold cavity 24. The programmer 60 functions to compare the pressure of the cavity as sensed by the transducer 72 as transmitted to the programming module through the pressure feedback line 68, with the setting of the cavity pressure dial 84. When cavity pressure has reached the pressure set upon the dial 84, this indicates that the mold 24 has been filled. At this instant of mold fill, the module 60 operates to override the velocity program and to stop the ram 16 to prevent the pressure in the cavity 24 from exceeding a preset value.

When the ram has stopped at the end of this injection stroke as indicated by the arrival of the pressure within the cavity 24 at the present pressure as determined by the dial 84, a certain amount of moldable material is left between the ram tip 29 and the orifice 22 of the cavity. The linear dimension of this amount of material is referred to as the cushion. A measurement of this cushion is derived by sampling the output of the position transducer 71 on line 67 at the instant that the present cavity pressure has been attained. The programmer module 60 further comprises means for maintaining this cushion at some constant predetermined value as can be set by the dial 86. This dial is preferably calibrated in terms of percent of the total ram stroke length. The means for controlling this cushion will be described in more detail below.

The module 60 also includes means for establishing what is referred to as the shot size. The control which provides for this is the shot size dial 88. The shot size is defined as the dimension through which the ram will travel during an injection stroke plus that of the cushion which remains at the end of the injection stroke, or in other words, the distance between the furthest retracted position of the tip of the ram 29 and the orifice 22. The shot size dial 88 merely provides means for establishing an initial setting of the shot size and, generally, this is selected by the operator to correspond to the approximate volume of the mold to be filled. The module 60 is provided with means for varying the shot size from cycle to cycle in order to maintain the constant cushion referred to above in connection with the cushion control dial 86. As stated above, when the pressure in the cavity 24 exceeds that set upon the pressure dial 84, the position of the ram can be measured by sampling the position feedback signal on line 67. This establishes the actual cushion which was left during that particular injection cycle. This actual cushion is compared to the desired cushion set upon the dial 86. If it is either too large or too small, the shot size setting is modified so that, in the next injection cycle, the cushion will be closer to the desired value.

Thus, the pressure feedback signal serves two functions: first, to limit cavity pressure by stopping the ram, and second, to signal the precise time during each cycle at which the cushion can be measured.

The programmer module 60 is provided with an additional feature of allowing the velocity program to be alterably correlated to different portions of the actual ram stroke. In the embodiment illustrated, the points represented by each of the vertical conductors 77 of the velocity program module patch panel 75 are automatically evenly spaced between end points determined by the settings of the cushion control dial 86 and the shot size dial 88 respectively. This is achieved, for example, by providing a voltage divider network connected between the outputs of the respective dials 86 and 88 which voltage divider network operates as the reference signal generator for coincidence circuits which trigger a shift register which selectively connects the points represented by the various vertical conductors 77 of the program module 75 to the ram command line 69.

The module 60 is also provided with a hold time dial 91 control which enables the operator to set the duration of the hold time interval and the width of the control pulse to be applied on the output line 64.

The system is further provided with a short-shot alarm indicated by the panel light 92. This alarm is actuated if either one of two conditions occurs. The first condition is that of the ram tip 29 bottoming out at the orifice 22 at the downstream end of the chamber 15. This indicates that all of the material has been exhausted prior to the complete filling of the mold cavity 24. Additionally, the alarm is sounded when the ram is retracted to its maximum retracted position, which indicates that there is insufficient capacity within the chamber 15 to supply the amount of cushion selected by the dial 86. To supply these alarm signals, limit switches may be provided at the respective ends of the ram stroke, or, a position signal may be derived from the position feedback signal on line 67. Normally, conventional machines are provided with limit switches at these locations and these may be used for this purpose.

Additional controls are provided in the module 60 such as the power control push button and dial light 93, automatic and manual mode selection switches 94 and 95, respectively, and a series of cycle indicator lights 96 which indicate various conditions of the machine and various points in the operating cycle.

Figure 2:
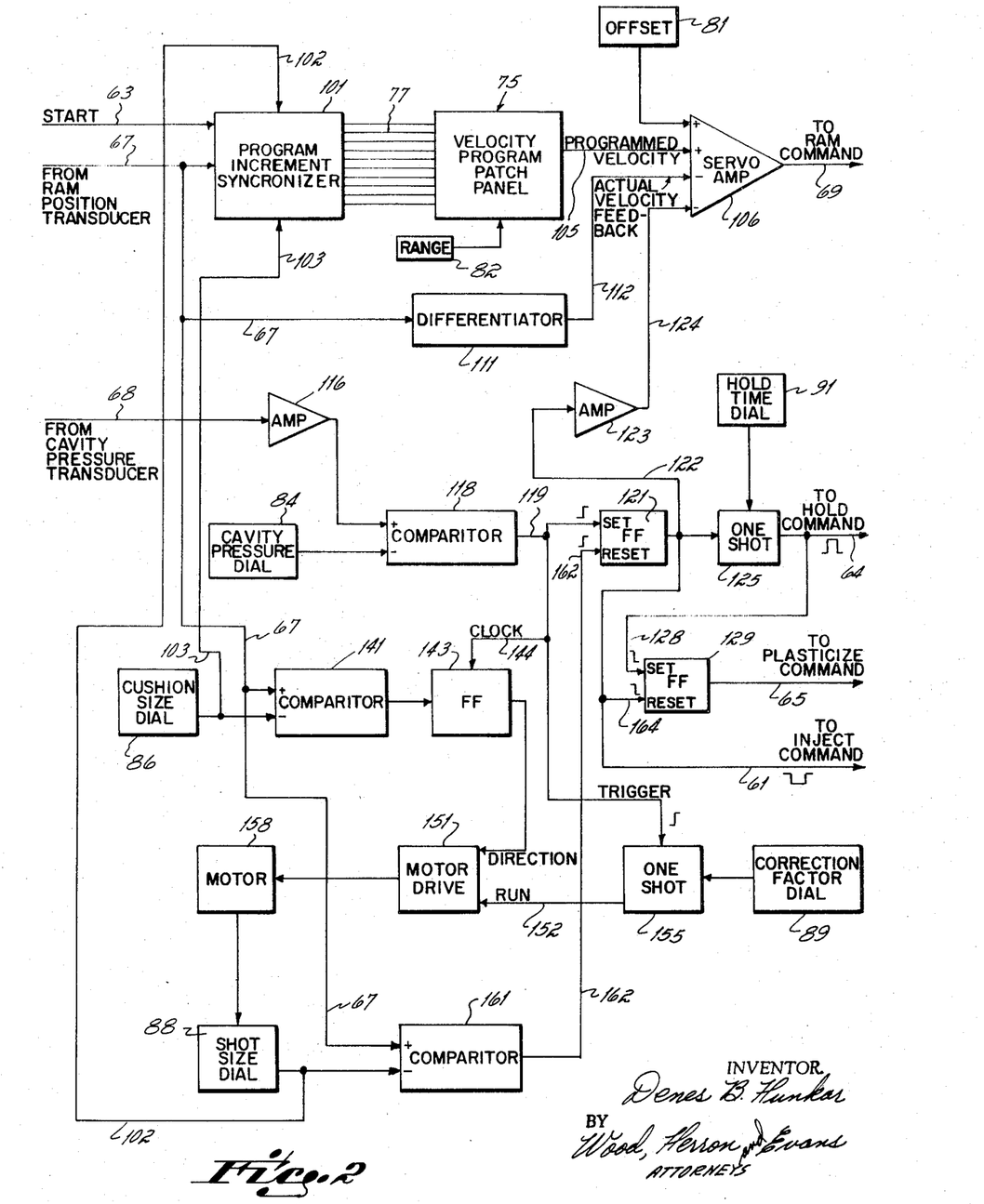
FIG. 2 is a functional and logical block diagram illustrating the control circuitry of the ram programmer module of FIG. 1.

The internal logic of the programmer module 60 of FIG. 1 is best illustrated in FIG. 2. As shown in FIG. 2, the velocity program patch panel 75 is illustrated. The vertical conductors 77 of the patch panel 75 represent different distinct regions of the stroke of the ram 16. These are connected to the outputs of a program increment synchronizer circuit 101. This circuit operates to energize the one of these vertical conductors 77 which corresponds to that portion of the stroke of the ram 16 which represents the present position of the ram as measured by the ram position transducer which is connected through the line 67 to the circuit 101. This circuit may take many forms, the preferred form being the provision of a series of flip-flops in a shift register arrangement with its respective outputs connected to gates in the circuits of each one of the conductors 77 to selectively and sequentially connect each one of the conductors to the output line 69 as the ram proceeds through its injection stroke. The shift register is triggered by a series of coincidence circuits, each having inputs connected to the position signal line 67 and to a respective voltage reference. The outputs of the coincidence circuits operate solid state switches which connect the respective vertical conductor 77 to the output 105 of the velocity function generator. The voltage references are derived from a voltage divider network connected between the adjustable voltage inputs 102 and 103 which are connected to the outputs of the shot size dial 88 and cushion size dial 86, respectively. In this manner, the circuit 101 functions to automatically divide the portion of the ram stroke which is defined as that region lying between the shot size as set upon the dial 88 and the cushion size as set upon the dial 86 defining the opposite ends of the injection stroke. This interval is divided into a number of segments which are preferably equal in length and correspond each to a different position of the ram. When the ram is in one of these positions, the respective vertical conductor of the set 77 is actuated to select the appropriate programmed velocity from the program panel 75 and to apply this signal to the output line 105 of the function generator 75. The appropriate programmed velocity signal is derived from the horizontal conductor 76 to which the actuated one of the conductors 77 is connected via the patch panel.

The output line 105 is connected to a positive input of a servo amplifier 106 which has its output connected to the ram command signal line 69. The offset control 81 is also connected to a positive input of the servo amplifier 106 to allow independent modification of the command signal independent of the program 75. This will effectively alter the program velocity function by a constant value at each program point. The range selector 82 is connected to the function programmer 75 in a manner which will effect the overall amplitude of the signal on line 105.

A differentiator 11 has its input connected to the ram position signal line 67 to develop a ram velocity signal on the line 112. This signal is fed back to a negative input of the servo amplifier 106. When the actual ram velocity represented by this signal exceeds that of the programmed velocity as represented by the signal on line 105 (as modified by the offset signal source 81), the analog signal on line 69 will change to effect correspondingly the operation of the servo valve 34 to slow down the ram 16. If this signal on line 112 is less than that on line 105, the signal on line 69 will be altered in a manner which will operate the valve 34 to speed up the ram 16, thus maintaining the actual velocity substantially equal to the programmed velocity at each point in the ram stroke.

The pressure feedback signal from the cavity pressure transducer 72 on the line 68 is fed to the input of an amplifier 116 which has its output connected to the positive input of a comparator circuit 118. The comparator circuit 118 may take one of many conventional forms, suitable circuitry to achieve this function would involve a differential amplifier supplying positive and negative inputs and having its output connected to the input of a Schmitt trigger which would develop a digital signal on the comparator output line 119. The negative input of the comparator is connected to the output of a cavity pressure dial 84. When the actual pressure as indicated by the output of the amplifier 116 is greater than that set on the cavity pressure dial 84, the output of the comparator circuit on line 119 is negative. As soon as the output of amplifier 116 exceeds that set on the dial 84, the output of the comparator circuit goes positive, generating a postiive going signal which sets a flip-flop 121 to an ON condition, imposing a positive signal on the flip-flop output line 122. This signal is applied to the input of an integrating amplifier 123 which has its output 124 connected to a negative input of the servo amplifier 106. The gain of the amplifier 123 is such that, when the pulse output of the flip-flop 121 on line 122 goes positive, a signal on line 124 is generated which, when fed to the servo amplifier 106, will override the velocity programmed in such a way as to impose a signal on line 69 which will stop the motion of the ram. The time constant of the amplifier 123 is such as to prevent rate of change of the output of the servo amplifier from exceeding the response to the servo valve 34. To allow this will cause a loss of control which will enter an unpredictable factor into the system operation and may allow the inertia of the valve to cause overshoot which may result in loss of pressure to the mold.

Generally, the provision for this pressure override of the velocity program will cure a certain amount of operator error in setting up the velocity program and in his making an improper shot-size selection.

The output 122 of the flip-flop 121 is also connected to the input of a one-shot multivibrator 125. This multivibrator 125 generates a constant duration pulse on the hold command output line 64. The length of this pulse is controlled by the setting of the hold time dial 91. Thus, at the end of the injection cycle as indicated by the state of the output 119 of comparator 118 indicating that the mold 24 has arrived at fill pressure, the hold cycle will commence.

The output of the one-shot multivibrator 125 is also connected to the set input 128 of a flip-flop 129. The trailing edge of the pulse on line 128 will set the flip-flop 129 to an ON condition, energizing the plasticizing command line 65 to initiate the plasticizing cycle. Thus, the plasticizing cycle will follow the hold cycle.

The output of the cushion size dial 86 is also connected to a negative input of a comparator circuit 141 which has its positive input connected to the ram position transducer feedback line 67. The output of the comparator 141 is positive whenever the distance between the ram tip 29 and the orifice 22 are greater than the cushion size as set upon the dial 86 and is negative whenever this distance is less. A flip-flop 143 serves as a sampling circuit for the output of the comparator 141. The flip-flop 143 may be a JK flip-flop or any other equivalent circuit which may have its J and K inputs connected respectively to positive and inverted outputs of a comparator 141. The clock input 141 of the flip-flop 143 is connected to the output 119 of the comparator circuit 118 so that the flip-flop 143 will be set to a condition which is representative of the sampled relative cushion dimension at the instant that the mold cavity attains fill pressure. The ON condition of the flip-flop indicates that the cushion at the moment of fill is too long, and the OFF condition of the flip-flop 143 indicates that the cushion at the moment of fill is too short.

The output of the flip-flop 143 is connected to a direction control input of the motor drive 151. The state of the flip-flop 143 will thus control the direction in which the motor 151 will be driven when it is energized through another input 152 which is connected to the output of a one-shot multivibrator 155. The input of this multivibrator 155 is also connected to the output 119 of the comparator 118 so that the multivibrator is triggered at the instant, or shortly after, the cavity has arrived at fill pressure. The length of the pulse of the one-shot multivibrator 155 is controlled by the correction factor dial 89. When the one-shot multivibrator is energized, the motor 151 will be driven a finite rotational distance as determined by the width of the multivibrator pulse as set by the dial 89. This will energize the motor 158 which is connected mechanically to the shot size dial 88. Thus, by a direct close loop feedback comparison of the cushion size as actually measured at the instant the cavity is filled with that set upon the dial 86, the shot size control 88 is corrected by a fixed increment in each cycle depending on whether the cushion size on the previous cycle was longer or shorter than the desired value. Thus, the closed loop feedback system is provided which maintains the cushion size constant through control of the retracted position as set by the shot size dial 88. While it is not essential that the dial 88 be mechanically moved, an advantage is provided by this arrangement in that a display of the actual shot size provides information to the operator which will allow him in future setups to more precisely set the proper initial value. Furthermore, this visual display serves as a general reflection of any changes in the material viscosity which are taking place. Generally, improper initial shot size selection can be corrected by this system.

The output of the shot size dial 88 is connected to a negative input of a comparator 161 which has its positive input connected to the ram position feedback line 67. Thus, during the plasticizing portion of the cycle, when the ram has retracted to the position as set by the shot size dial 88, a positive signal is generated on the output line 162 of comparator circuit 161 which generates a reset pulse to reset the flip-flop 121. The resetting of the flip-flop removes a signal from the line 122 which operates to reset the amplifier 123 and remove the signal from the line 124 at the input of the servo amplifier 106 to return the control of the servo amplifier 106 to that of a velocity program. The output of flip-flop 121 is further connected to a reset input 164 of the flip-flop 129. The trailing edge of the signal on the input 164 resets the flip-flop 129 to terminate the plasticizing cycle signal on line 65. The output of flip-flop 121 also applies an inject command signal to the inject command line 61 in the form of a negative pulse.

OPERATION SUMMARY

The operation of the machine may be summarized as follows by reference jointly to FIGS. 1 and 2. First, the operator makes appropriate settings on the programmer panel 60. First, he establishes a program on the patch panel 75 by inserting connectors into the patch panel board to associate a specific programmed velocity with each region of the ram position. He may adjust the offset controls 81 and range selector switch 82 appropriately to give the desired output functions. The program is usually determined by the geometry of the mold and the properties of the material being injected into the mold. The operator then makes an appropriate setting of the hold time on the hold time dial 91 and sets the cavity fill pressure limit on the dial 84. The operator then sets the shot size on dial 88 and the cushion size on dial 86. As he does this, the voltages are applied to input lines 102 and 103 of the programmer increment synchronizer circuit 101 which allows the circuit to automatically set the points which relate to the regions controlled by the various vertical conductors 77 on the patch panel board. At this point in time, the operator may operate the machine in manual mode for a few cycles to allow him to monitor the operation of the machine and then he may switch the machine to automatic mode by depression of the button 94. It will be assumed for purposes of the following discussion that the machine begins automatic mode operation with the ram at its furthest advanced position at the beginning of what will be the plasticizing portion of the cycle. Flip-flops 121 and 129 will at this time both be in their ON conditions and a signal will appear on the plasticizing command signal line 65 which will energize the back pressure solenoid 54 and the switch 66 controlling the screw rotating motor 28. The screw will thus rotate, plasticizing and compacting the moldable material ahead of the ram tip 29.

Eventually, the ram will be forced by the pressure of the material within the chamber 15 against the back pressure of the fluid working through the valve 52 until the ram is moved to a position equal to the position represented by the setting on the shot size dial 88. When this condition occurs, the signal on line 67 as measured at the input of the comparator circuit 161 will equal that supplied to the comparator circuit 161 from the shot size dial 88 and the output 162 of circuit 161 will go positive, resetting the flip-flop 121. This will also reset the flip-flop 129, removing the signal from the plasticizing command line 65, turning off the motor 28 and closing the solenoid valve 54. This will further initiate the inject command on line 61 which will interrogate the machine interlocks 62 and return a start signal pulse from the machine on line 63 which will initiate the programming increment synchronizer to energize the first conductor 77 which corresponds to the retracted most increment of the ram stroke range. This will apply an appropriate velocity program signal via the patch panel 75 to the servo amplifier 106 on its input line 105. This causes an output signal to be generated on line 69 which will open the solenoid valve 34 until the actual velocity of the ram as derived from the differentiation by differentiator 111 of the ram position signal on line 67 is equal to the program velocity on line 105 as measured at the servo amplifier 106. As the position of the ram changes, the signal changes and the input of the program increment synchronizer 101 and causes sequential energization of the various conductors 77 to apply the program function through the patch panel 75 to line 105 which is in exact correlation with the position of the ram. Ultimately, the ram will approach the end of its stroke and the cavity will be filled with moldable material. At this point, the pressure will increase rapidly within the cavity 24 and this pressure will be reflected by the analog signal on line 68 which, appropriately amplified in amplifier 116, will quickly exceed the signals supplied to the comparator 118 as set by the cavity pressure dial 84. This will cause the output of the comparator circuit 118 to switch from negative to positive. This will set the flip-flop 121 on its ON condition and apply the output signal of the flip-flop to the servo amplifier 106 to override the velocity program control and to terminate the drive to the ram.

This will close the valve 34 and initiate the timing interval of the one-shot multivibrator 125 as set by the hold time dial 91 to energize the hold command signal line 64 and thus the hold pressure solenoid 46 to apply the hold pressure from the circuit 41 to the cylinder 27. The positive going output of the comparator 118 causes the flip-flop 143 to be set to a condition reflective of the state of the output of the comparator circuit 141 which indicates the relative length of the actual cushion to that of the cushion size as set upon the dial 86. This will control the direction of the motor drive 151 which will drive the servo motor 158 to adjust the shot size dial 88 to regulate the shot size during the next cycle in a manner which will tend to accommodate for any discrepancy in the cushion size of the previous cycle. The output 119 also triggers the one-shot multivibrator 155 which applies the drive pulse which defines the duration of the fixed increment, determined by the setting of the correction factor dial 89, that the motor 158 moves the dial 88.

It will be noted that the program domain of the function generator is variably set to automatically compute the increments based on the corrected interval as determined by the variable shot size which is automatically changed during the operation of the machine. This insures that the proper proportions of material correspond to each increment of the program even though the material may expand or contract and the viscosity may change in some degree or another. Thus, each vertical conductor of the program patch board 75 represents more precisely a fixed volume of material which is independent of periodic changes in the viscosity of the material being molded.

The subject matter of following U. S. patent applications, by the inventor of the subject matter of the present application, is hereby expressly incorporated in total by reference into the present application: application entitled "EXTRUDER CONTROL SYSTEM" filed Sept. 15, 1971, application Ser. No. 74,644 entitled "CONTROL SYSTEM FOR PARISON EXTRUDERS" filed Sept. 23, 1970, now U.S. Pat. No. 3,712,772 and application Ser. No. 875,448 filed Nov. 10, 1969, now abandoned.

What is claimed is:

1. In an injection molding machine having a reciprocating ram for injecting plasticized material from an injection barrel into a mold, a control system for selectively varying the velocity of said ram as it advances toward said mold as a function of the position of said ram, said control system comprising:
   drive means for advancing said ram;
   ram position signal generating means for generating signals corresponding to the position of said ram;
   a programmable electronic function generator controlled by signals from said ram position signal generating means for generating velocity command signals correlated with the position of said ram;
   a velocity feedback signal generator for generating ram velocity feedback signals corresponding to the velocity of said ram;
   a servoamplifier for energizing said drive means in accordance with said velocity command and velocity feedback signals;
   whereby the velocity of said ram is varied in a predetermined manner in accordance with ram position.

2. The apparatus of claim 1 further including:

a sensor responsive to the pressure of material within said mold cavity; and means responsive to said mold cavity pressure sensor for rendering said servoamplifier ineffective to control said drive means when said mold cavity pressure reaches a predetermined cutoff pressure.

3. The apparatus of claim 2 further including:

second means responsive to said mold cavity pressure sensor for applying a second predetermined hydraulic pressure on said ram when said mold cavity pressure reaches said predetermined cutoff pressure.

4. The apparatus of claim 1 in which said ram advances from a retracted shot position and in which the signals generated by the ram position generator are correlated with the displacement of the ram from said retracted shot position.

5. The apparatus of claim 4 including:

means for varying said retracted shot position.

6. The apparatus of claim 1 further including:

an offset signal generator for additively modifying the velocity command signals from said function generator.

7. The apparatus of claim 1 further including:

a range function generator for multiplicatively modifying the velocity command signals from said function generator.

8. In an injection molding machine having a reciprocating ram for injecting plasticized material from an injection barrel into a mold cavity, a control system for said ram, said control system comprising:

hydraulic pressure fluid circuit means for advancing said ram;

electrically responsive valve means for controlling said hydraulic pressure fluid circuit means;

a sensor responsive to the pressure of material within said mold cavity;

means responsive to said mold cavity pressure sensor for actuating said electrically responsive valve means to reduce the pressure on said hydraulic fluid circuit when said mold cavity pressure reaches a predetermined cutoff pressure, whereby said mold cavity pressure is reduced to a holding pressure.

9. In an injection molding machine having a reciprocating ram for injecting plasticized material from an injection barrel into a mold cavity, a control system for said ram, said control system comprising:

hydraulic pressure fluid circuit means for advancing said ram;

first electrically responsive valve means for controlling said hydraulic pressure fluid circuit means;

second electrically responsive valve means for controlling said hydraulic pressure fluid circuit means;

a sensor responsive to the pressure of material within said mold cavity;

means responsive to said mold cavity pressure sensor for removing said first electrically responsive valve means from control of said hydraulic pressure fluid circuit means and for actuating said second electrically responsive valve means to establish a different pressure on said hydraulic fluid circuit when said mold cavity pressure reaches a predetermined cutoff pressure, whereby said mold cavity pressure is changed to a holding pressure.

10. In an injection molding machine having a reciprocating ram for injecting plasticized material from an injection barrel into a mold cavity, said ram being reciprocated between a retracted shot position and a forwardmost position, a control system for said ram, said control system comprising:

hydraulic pressure fluid circuit means for advancing said ram;

electrically responsive valve means for controlling said hydraulic pressure fluid circuit means;

a sensor responsive to the pressure of material within said mold cavity;

first means responsive to said mold cavity pressure sensor for actuating said electrically responsive valve means to reduce the pressure on said hydraulic fluid circuit when said mold cavity pressure reaches a predetermined cutoff pressure;

second means responsive to said mold cavity pressure sensor for comparing the position of said ram at that time with a preselected reference position of said ram;

means responsive to said comparison for controlling the retracted position of said ram during the next succeeding stroke of said ram.

11. The control system of claim 10 further comprising:

means for controlling the velocity of said ram at the time said mold cavity pressure reaches said predetermined cutoff pressure.

12. In an injection molding machine having a reciprocating screw ram which rotates and reciprocates between a retracted shot position at the beginning of an injection stroke and an advanced position at the end of an injection stroke, said ram injecting plasticized material into a mold cavity, a control system comprising:

a position feedback signal generator for generating a position feedback signal correlated with the position of said ram;

means for establishing a first reference signal corresponding to a selected advanced position;

means for establishing a second reference signal corresponding to a selected retracted shot position;

means for initiating advancement of said screw when said screw is retracted to a position in which said position feedback signal corresponds to said second reference signal;

a pressure feedback signal generator for providing a pressure feedback signal corresponding to the pressure of said material in said mold cavity;

means for establishing a third reference signal corresponding to a given pressure;

means for comparing said position feedback signal and said first reference signal when said pressure feedback signal corresponds to said third reference signal; and means for modifying said second reference signal in accordance with the results of said comparison.

13. The apparatus of claim 12 further comprising:

means responsive to said first and second reference signals to determine the total stroke of said ram;

means for electrically dividing said total stroke into a plurality of segments; and means for controlling the velocity of said ram over each of said segments.

14. In an injection molding machine having a reciprocating ram for injecting plasticized material from an injection barrel into a mold cavity, said ram being reciprocated between a retracted shot position and a forward position, a control sytem for selectively varying the velocity of said ram as it advances from said retracted shot position to said forward position as a function of the position of said ram, said control system comprising:

drive means for advancing said ram;

ram position signal generating means for generating signals correlated with the position of said ram;

a programmable electronic function generator interconnected with said ram position generating means for generating velocity command signals correlated with the position of said ram;

means for establishing electrical signals corresponding to the retracted shot and forward positions of the ram to thereby establish the stroke of said ram therebetween;

said ram position signal generating means including means for automatically dividing the said ram stroke into a plurality of segments, and means generating a discrete signal for each segment;

said programmable electronic function generator generating a separate preset velocity command signal for each signal from the ram signal generator;

a velocity feedback signal generator for generating ram velocity feedback signals corresponding to the velocity of said ram;

a servoamplifier for energizing said drive means in accordance with said velocity command and velocity feedback signals;

whereby the velocity of said ram is varied in a predetermined manner during substantially the entire ram stroke as a function of ram displacement from the ram retracted shot position.

* * * * *

UNITED STATES PATENT OFFICE
CERTIFICATE OF CORRECTION

Patent No. 3,767,339          Dated  October 23, 1973

Inventor(s) Denes B. Hunkar

It is certified that error appears in the above-identified patent and that said Letters Patent are hereby corrected as shown below:

Column 14, line 48 after "mold" insert --cavity--.

Column 15, line 41 after "circuit" insert --means--; line 62 after "circuit" insert --means--.

Column 16, line 14 after "circuit" insert --means--; line 18 delete "that" and insert --the--; line 18 after "time" insert --when said mold cavity pressure reaches said predetermined cutoff pressure--; line 41 after "screw" insert --ram--; line 42 after "screw" insert --ram--.

Signed and sealed this 19th day of March 1974.

(SEAL)
Attest:

EDWARD M. FLETCHER, JR.
Attesting Officer

C. MARSHALL DANN
Commissioner of Patents